US008983980B2

(12) United States Patent
Song et al.

(10) Patent No.: US 8,983,980 B2
(45) Date of Patent: Mar. 17, 2015

(54) DOMAIN CONSTRAINT BASED DATA RECORD EXTRACTION

(75) Inventors: Xinying Song, Harbin (CN); Yunbo Cao, Beijing (CN); Chin-Yew Lin, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 455 days.

(21) Appl. No.: 12/945,517

(22) Filed: Nov. 12, 2010

(65) Prior Publication Data

US 2012/0124077 A1    May 17, 2012

(51) Int. Cl.
G06F 17/30 (2006.01)
G06F 7/00 (2006.01)
G06F 17/22 (2006.01)

(52) U.S. Cl.
CPC .................................. *G06F 17/227* (2013.01)
USPC ............................ 707/754; 707/776; 707/793

(58) Field of Classification Search
CPC ............ G06F 17/227; G06F 17/30539; G06F 17/30908
See application file for complete search history.

(56) References Cited

U.S. PATENT DOCUMENTS

| | | | |
|---|---|---|---|
| 7,512,610 B1 * | 3/2009 | Barabas et al. ........................ 1/1 |
| 8,589,366 B1 * | 11/2013 | Younes et al. ................. 707/705 |
| 2003/0229850 A1 * | 12/2003 | Lue ................................ 715/513 |
| 2006/0026496 A1 * | 2/2006 | Joshi et al. .................. 715/500.1 |
| 2008/0071819 A1 | 3/2008 | Monsarrat |
| 2009/0132566 A1 * | 5/2009 | Ochi et al. ..................... 707/100 |
| 2009/0265363 A1 | 10/2009 | Lai et al. |
| 2010/0083095 A1 * | 4/2010 | Nikovski et al. ............... 715/234 |
| 2010/0115436 A1 * | 5/2010 | Embley et al. ................. 715/763 |
| 2010/0185684 A1 * | 7/2010 | Madaan et al. ............... 707/803 |
| 2010/0185689 A1 | 7/2010 | Hu et al. |
| 2010/0211533 A1 | 8/2010 | Yang et al. |
| 2010/0241639 A1 * | 9/2010 | Kifer et al. ..................... 707/754 |
| 2011/0066957 A1 * | 3/2011 | Prats et al. ..................... 715/753 |
| 2011/0161409 A1 | 6/2011 | Nair et al. |
| 2011/0246261 A1 * | 10/2011 | Kassaei et al. ............... 705/7.38 |
| 2011/0252073 A1 | 10/2011 | Pauly |
| 2012/0005239 A1 * | 1/2012 | Nevin, III ..................... 707/798 |

(Continued)

OTHER PUBLICATIONS

Arasu, et al., "Extracting Structured Data from Web Pages", retrieved on Aug. 25, 2010 at <<http://citeseerx.ist.psu.edu/viewdoc/download?doi=10.1.1.93.6651&rep=rep1&type=pdf>>, ACM, Proceedings of SIGMOD International Conference on Management of Data, San Diego, California, Jun. 2003, 12 pgs.

(Continued)

*Primary Examiner* — Alicia Willoughby
(74) *Attorney, Agent, or Firm* — Dan Choi; Judy Yee; Micky Minhas (57) ABSTRACT

Embodiments for a Mining Data Records based on Anchor Trees (MiBAT) process are disclosed. In accordance with at least one embodiment, the MiBAT process extracts data records containing user-generated content from web documents. The web document is processed into a Document Object Model (DOM) tree in which sub-trees of the DOM tree represent the data records of the web document. Domain constraints are used to locate structured portions of the DOM tree. Anchor trees are then located as being sets of sibling sub-trees which contain the domain constraints. The anchor trees are then used to determine a record boundary (i.e. the start offset and length) of the data records. Finally, the data records are extracted based on the anchor trees and the record boundaries.

20 Claims, 8 Drawing Sheets (56) References Cited

U.S. PATENT DOCUMENTS

2012/0005686 A1* 1/2012 Rajan et al. .................. 718/105
2013/0173578 A1* 7/2013 Epstein ........................ 707/706

OTHER PUBLICATIONS

Buttler, et al., "A Fully Automated Object Extraction System for the World Wide Web", retreived on Aug. 25, 2010 at <<http://citeseerx.ist.psu.edu/viewdoc/download?doi=10.1.1.27.1497&rep=rep1&type=pdf>>, IEEE, Proceedings of Intl Conf on Distributed Computing Systems, Mesa, Arizona, Apr. 2001, 10 pgs.

Chang, et al., "A Survey of Web Information Extraction Systems", retrieved on Aug. 25, 2010 at <<http://citeseerx.ist.psu.edu/viewdoc/download?doi=10.1.1.141.1628&rep=rep1&type=pdf>>, IEEE Transactions on Knowledge and Data Engineering, vol. 18, No. 10, Oct. 2006, 18 pgs.

Chang, et al., "IEPAD: Information Extraction Based on Pattern Discovery", retrieved on Aug. 25, 2010 at <<http://citeseerx.ist.psu.edu/viewdoc/download?doi=10.1.1.18.1532&rep=rep1&type=pdf>>, ACM, Proceedings of International Conference on World Wide Web (WWW), Hong Kong, May 2001, pp. 681-688.

Chuang, et al., "Tree-Structured Template Generation for Web Pages", retrieved on Aug. 25, 2010 at <<http://hugo.csie.ntu.edu.tw/~yjhsu/pubs/2004/WI2004.pdf>>, IEEE Computer Society, Proceedings of International Conference on Web Intelligence (WI), Sep. 2004, 7 pgs.

Crescenzi, et al., "RoadRunner: Towards Automatic Data Extraction from Large Web Sites", retrieved on Aug. 25, 2010 at <<http://citeseerx.ist.psu.edu/viewdoc/download?doi=10.1.1.21.8672&rep=rep1&type=pdf>>, Morgan Kaufmann Publishers, Proceedings of VLDB Conference, Roma, Italy, Sep. 2001, 10 pgs.

Embley, et al., "Record-Boundary Discovery in Web Documents", retrieved on Aug. 25, 2010 at <<http://citeseerx.ist.psu.edu/viewdoc/download?doi=10.1.1.65.6756&rep=rep1&type=pdf>>, ACM, Proceedings of International Conference on Management of Data, Philadelphia, Pennsylvania, Jun. 1999, 24 pgs.

Hogue, et al., "Thresher: Automating the Unwrapping of Semantic Content from the World Wide Web", retrieved on Aug. 25, 2010 at <<http://citeseerx.ist.psu.edu/viewdoc/download?doi=10.1.1.61.955&rep=rep1&type=pdf>>, ACM, Proceedings of International Conference on World Wide Web (WWW), Chiba, Japan, May 2005, 10 pgs.

Hu, et al., "Mining and Summarizing Customer Reviews", retrieved on Aug. 25, 2010 at <<http://citeseerx.ist.psu.edu/viewdoc/download?doi=10.1.1.76.2378&rep=rep1&type=pdf>>, ACM, Proceedings of International Conference on Knowledge Discovery and Data Mining (KDD), Aug. 2004, Seattle, Washington, 10 pgs.

Labsky, et al., "The Ex Project:Web Information Extraction using Extraction Ontologies", retrieved on Aug. 25, 2010 at <<http://citeseerx.ist.psu.edu/viewdoc/download?doi=10.1.1.62.3666&rep=rep1&type=pdf>>, Proceedings of ECML/PKDD Workshop on Prior Conceptual Knowledge in Machine Learning and Knowledge Discovery (PriCKL), Warsaw, Poland, Oct. 2007, 12 pgs.

Laender, et al., "A Brief Survey of Web Data Extraction Tools", retrieved on Aug. 25, 2010 at <<http://citeseerx.ist.psu.edu/viewdoc/download?doi=10.1.1.11.3652&rep=rep1&type=pdf>>, ACM SIGMOD Record, vol. 31, No. 2, Jun. 2002, 10 pgs.

Liu, et al., "Mining Data Records in Web Pages", retrieved on Aug. 25, 2010 at <<http://citeseerx.ist.psu.edu/viewdoc/download?doi=10.1.1.62.5289&rep=rep1&type=pdf>>, ACM, Proceedings of International Conference on Knowledge Discovery and Data Mining, Washington, D.C., Aug. 2003, 10 pgs.

Liu, et al., "NET—A System for Extracting Web Data from Flat and Nested Data Records", retrieved on Aug. 25, 2010 at <<http://citeseerx.ist.psu.edu/viewdoc/download?doi=10.1.1.78.3452&rep=rep1&type=pdf>>, Proceedings of International Conference on Web Information Systems Engineering (WISE), Nov. 2005, 8 pgs.

Liu, "Web Content Mining", retrieved on Aug. 25, 2010 at <<http://www.cs.uic.edu/~liub/Web-Content-Mining-2.pdf>>, Proceedings of International World Wide Web Conference—Tutorial (WWW), Chiba, Japan, May 2005, 83 pgs.

Liu, "Web Data Mining: Exploring Hyperlinks, Contents and Usage Data", Data-Centric Systems and Applications (Book), Chap 9.5.2 through Chap 9.9, Springer-Verlag Berlin Heidelberg 2007, pp. 346 to 367.

Miao, et al., "Extracting Data Records from the Web Using Tag Path Clustering", retrieved on Aug. 25, 2010 at <<http://www.www2009.org/proceedings/pdf/p981.pdf>>, ACM, Proceedings of International Conference on World Wide Web (WWW), Madrid, Spain, Apr. 2009, pp. 981-990.

Myllymaki, "Effective Web Data Extraction with Standard XML Technologies", retrieved on Aug. 25, 2010 at <<http://citeseerx.ist.psu.edu/viewdoc/download?doi=10.1.1.1.4674&rep=rep1&type=pdf>>, ACM, Proceedings of International Conference on World Wide Web (WWW), Hong Kong, May 2001, 8 pgs.

Reis, et al., "Automatic Web News Extraction Using Tree Edit Distance", retrieved on Aug. 25, 2010 at <<http://citeseerx.ist.psu.edu/viewdoc/download?doi=10.1.1.1.7765&rep=rep1&type=pdf>>, ACM, Proceedings of International Conference on World Wide Web (WWW), New York, Ny, May 2004, pp. 502-511.

Selkow, "The Tree-to-Tree Editing Problem", Information Processing Letters, vol. 6, No. 6, Dec. 1977, pp. 184-186.

Simon, et al., "ViPER: Augmenting Automatic Information Extraction with Visual Perceptions", retrieved on Aug. 25, 2010 at <<http://citeseerx.ist.psu.edu/viewdoc/download?doi=10.1.1.85.1291&rep=rep1&type=pdf>>, ACM, Proceedings of International Conference on Information and Knowledge Management (CIKM), Bremen, Germany, Oct./Nov. 2005, 8 pgs.

Tai, "The Tree-to-Tree Correction Problem", retrieved on Aug. 25, 2010 at <<http://www.itu.dk/stud/speciale/bepjea/xwebtex/litt/the-tree-to-tree-corrention-problem.pdf>>, Journal of the ACM, vol. 26, No. 3, Jul. 1979, pp. 422-433.

Wang, et al., "Data Extraction and Label Assignment for Web Databases", retrieved on Aug. 25, 2010 at <<http://web.archive.org/web/20070821170301/http://elvis.slis.indiana.edu/irpub/WWW/2003/pdf27.pdf>>, ACM, Proceedings of International Conference on World Wide Web (WWW), Budapest, Hungary, May 2003, pp. 187-196.

Yang, et al., "A Structural Support Vector Method for Extracting Contexts and Answers of Questions from Online Forums", retrieved on Aug. 25, 2010 at <<http://aclweb.org/anthology-new/D/D09/D09-1054.pdf>>, Proceedings of Conference on Empirical Methods in Natural Language Processing, Singapore, Aug. 2009, pp. 514-523.

Yang, "Identifying Syntactic Differences Between Two Programs", retrieved on Aug. 25, 2010 at <<http://citeseerx.ist.psu.edu/viewdoc/download?doi=10.1.1.13.9377&rep=rep1&type=pdf>>, John Wiley and Sons, Software—Practice and Experience, vol. 21, No. 7, Jun. 1991, pp. 739-755.

Yang, et al., "Incorporating Site-Level Knowledge to Extract Structured Data from Web Forums", retrieved on Aug. 25, 2010 at <<http://research.microsoft.com/en-us/um/people/leizhang/Paper/WWW2009_JiangMing.pdf>>, ACM, Proceedings of International Conference on World Wide Web (WWW), Madrid, Spain, Apr. 2009, 10 pgs.

Yin, et al., "Automatic Extraction of Clickable Structured Web Contents for Name Entity Queries", retrieved on Aug. 25, 2010 at <<http://research.microsoft.com/pubs/120887/fp0254-yin.pdf>>, ACM, Proceedings of International Conference on World Wide Web (WWW), Raleigh, North Carolina, Apr. 2010, 10 pgs.

Zhai, et al., "Web Data Extraction Based on Partial Tree Alignment", retrieved on Aug. 25, 2010 at <<http://citeseerx.ist.psu.edu/viewdoc/download?doi=10.1.1.96.4297&rep=rep1&type=pdf>>, ACM, Proceedings of International World Wide Web Conference (WWW), Chiba, Japan, May 2005, pp. 76-85.

Zhao, et al., "Fully Automatic Wrapper Generation for Search Engines", retrieved on Aug. 25, 2010 at <<http://citeseerx.ist.psu.edu/viewdoc/download?doi=10.1.1.136.4711&rep=rep1&type=pdf>>, ACM, Proceedings of International World Wide Web Conference (WWW), Chiba, Japan, May 2005, pp. 1-10.

(56) References Cited

OTHER PUBLICATIONS

Zheng, et al., "Efficient Record-Level Wrapper Induction", retrieved on Aug. 25, 2010 at <<http://clgiles.ist.psu.edu/pubs/CIKM2009-wrapper-induction.pdf>>, ACM, Proceedings of International Conference on Information and Knowledge Management (CIKM), Hong Kong, China, Nov. 2009, pp. 47-55.

Zheng, et al., "Joint Optimization of Wrapper Generation and Template Detection", retrieved on Aug. 25, 2010 at <<http://citeseerx.ist.psu.edu/viewdoc/download?doi=10.1.1.147.3417&rep=rep1&type=pdf>>, ACM, Proceedings of International Conference on Knowledge Discovery and Data Mining (KDD), San Jose, California, Aug. 2007, pp. 1-9.

Zhu, et al., "Dynamic Hierarchical Markov Random Fields and their Application to Web Data Extraction", retrieved on Aug. 25, 2010 at <<http://citeseerx.ist.psu.edu/viewdoc/download?doi=10.1.1.80.6849&rep=rep1&type=pdf>>, ACM, Proceedings of International Conference on Machine Learning (ICML), Corvalis, Oregon, vol. 227, Jun. 2007, 8 pgs.

Zhu, et al., "Simultaneous Record Detection and Attribute Labeling in Web Data Extraction", retrieved on Aug. 25, 2010 at <<http://citeseerx.ist.psu.edu/viewdoc/download?doi=10.1.1.71.9660&rep=rep1&type=pdf>>, ACM, Proceedings of International Conference on Knowledge Discovery and Data Mining (KDD), Philadelphia, Pennsylvania, Aug. 2006, 10 pgs.

Buttler, "A Short Survey of Document Structure Similarity Algorithms", In International Conference on Internet Computing, Jun. 2004, 9 pgs.

Chakrabarti et al, "The Paths More Taken: Matching DOM Trees to Search Logs for Accurate Webpage Clustering", In WWW, Apr. 2010, 10 pgs.

Cormen et al, "Introduction to Algorithms, Second Edition", The MIT Press and McGraw-Hill Book Company, 2001. Chapt 11, Hash Tables, 37 pgs.

Hlaing, et al., "An Approach for Extraction Data Record from Web Page based on Visual Features", In Proceedings of the International Journal of Advances in Management Science, vol. 1-1, Aug. 2011, 7 pages.

Song et al, "Automatic Extraction of Web Data Records Containing User-Generated Content", In CIKM 2010: Proceeding of the 19th ACM conference on Information and knowledge management, Oct. 2010, pp. 39-48.

Office action for U.S. Appl. No. 13/356,241, mailed on Jun. 3, 2014, Song et al., "Domain Constraint Path Based Data Record Extraction", 10 pages.

\* cited by examiner

DOMAIN CONSTRAINT BASED DATA RECORD EXTRACTION

BACKGROUND

Data record extraction pertains to extracting data records containing user-generated content (UGC) from web documents. Data record extraction may be useful in web mining applications such as question answering, blog or review mining, expert searching on web communities, etc. For example, a user who is interested in purchasing a new car may use data record extraction techniques to mine customer reviews pertaining to a new car of interest so that the user can make an informed decision on whether to purchase the new car.

In prior implementations, data record extraction techniques generally assume that the data records contain a limited amount of UGC and thus have similar structures. However, due to the free-format nature of UGC, data records containing UGC are generally of unstructured formats.

SUMMARY

Described herein are techniques and systems for extracting data records containing user-generated content (UGC) from web documents. Unlike previous methods which assume that data records containing UGC have similar structures, the data record extraction techniques described herein adopt a domain constraint approach referred to as Mining Data Records based on Anchor Trees (MiBAT). In general, MiBAT distinguishes a structured portion of the data records (e.g., author, publication date, etc.) from the free-formatted unstructured UGC part. The MiBAT process then uses the structured portion of the data records to locate and extract the data records.

In order to analyze the parts of the web document, the web document is represented as a Document Object Model (DOM) tree in which the nodes of the DOM tree include the UGC. Each data record of a data record list is deemed as consisting of the same number of sibling sub-trees on the DOM tree of the web document, where each of the sibling sub-trees is deemed the component sub-tree of the record. The nodes of the DOM tree then are analyzed based on a domain constraint. Domain constraints may be any object type that may be used as a basis for expression matching such as dates, times, numerical strings, etc. The nodes of the DOM tree which contain domain constraints are deemed the pivots. In some instances, the post publication date (i.e., post-date) is selected as the domain constraint since post-dates are commonly found in the structured part of a data record. The nodes of the DOM tree which are identified as containing text having a format of the domain constraint are deemed the candidate pivots of the DOM tree. However, not all the nodes containing text having a format of the domain constraint are real pivots (e.g., in forum posts, UGC may also contain strings in date format). Accordingly, similarity measures are applied to determine the anchor trees as being the component sub-trees of data records which contain the real pivot nodes. After determining the anchor trees, a record boundary (i.e., start offset and length) of the data records is determined. Finally, the data records are extracted based on the record boundary. The data records may then be stored or may be outputted. Other embodiments will become more apparent from the following detailed description when taken in conjunction with the accompanying drawings.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the Figure in which the reference number first appears. The use of the same reference number in different figures indicates similar or identical items.

DETAILED DESCRIPTION

The embodiments described herein pertain to a Mining Data Records based on Anchor Trees (MiBAT) process that utilizes domain constraints to extract data records containing User-generated Content (UGC). The MiBAT process distinguishes a structured portion of the data records which is structurally similar across data records (e.g., author, publication date, etc.) from the free-formatted unstructured UGC part (which may be structurally diverse across records) rather than assuming that data records containing UGC have similar structures overall. Accordingly, based on the detection of the repetition of similar structures of the structured portion, the MiBAT process automatically extracts consecutive or non-consecutive data records containing UGC from web documents even though the UGC is unstructured.

By focusing on the repetitive similar structures of the data records, the MiBAT process is able to automatically extract data records without too much prior knowledge or assumptions on the overall structure of the data records on the web documents. As a result, the MiBAT process pertains to extracting data records from a single web document that contains at least two or more data records. The MiBAT process is not designed to extract data records from a web document that contains only one single data record.

The techniques and systems described herein may be implemented in a number of ways. Example implementations are provided below with reference to the following figures.

Illustrative Scheme

Figure 1:
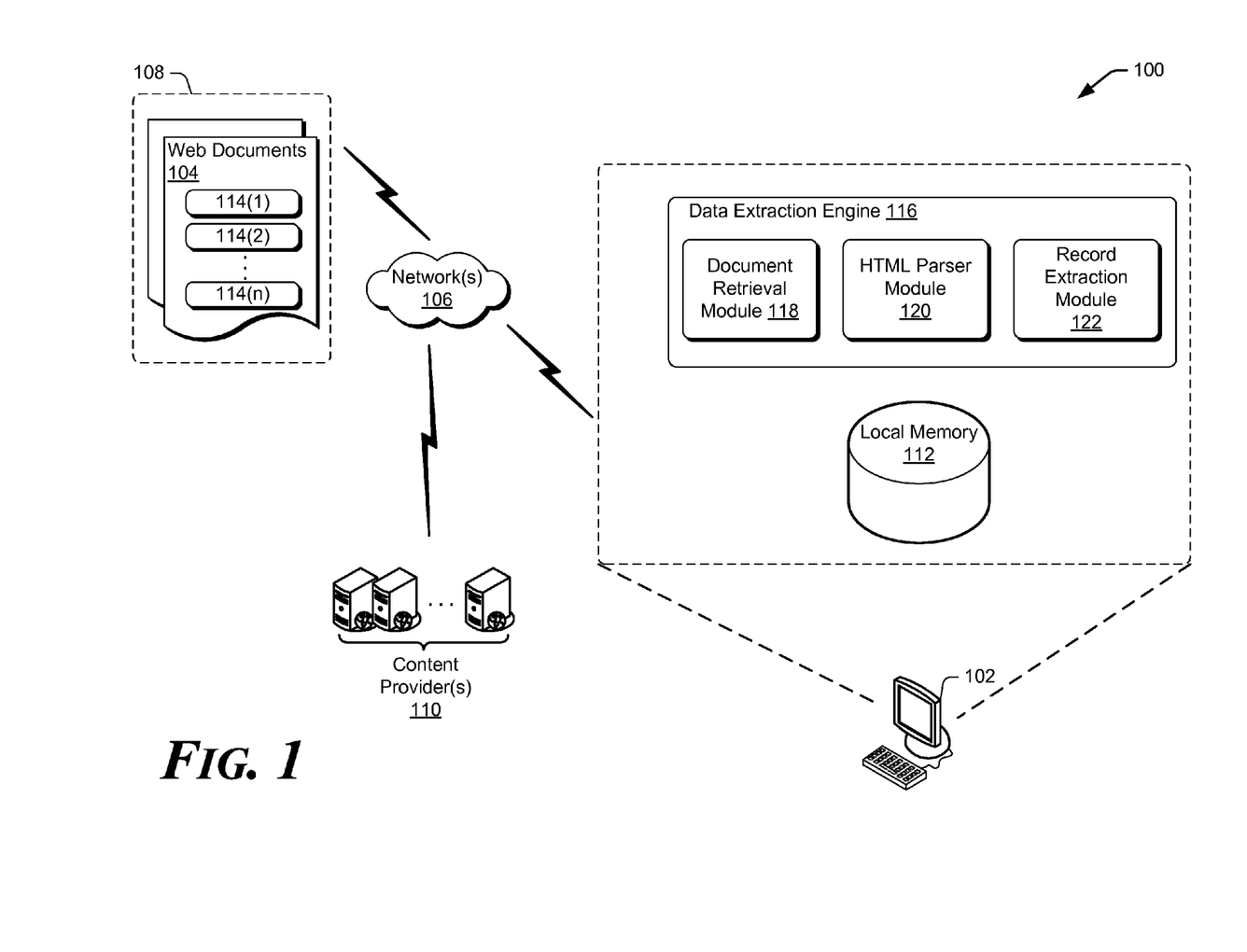
FIG. 1 shows a block diagram that illustrates a computing environment for extracting data records containing user-generated content from web documents, in accordance with various embodiments.

FIG. 1 illustrates a computing environment 100 for extracting web data records, in accordance with various embodiments. The computing environment 100 may include a computing device 102 to extract the web data records. The computing devices 102 may include any sort of such as personal computers, laptop computers, mobile phones, set-top boxes, game consoles, personal digital assistants (PDAs), portable media players (PMPs) (e.g., portable video players (PVPs) and digital audio players (DAPS)), and other types of computing devices.

The computing device 102 device may access one or more web documents 104 via one or more networks 106. The one or more networks 106 may include at least one of wide-area networks (WANs), local area networks (LANs), and/or other network architectures. The web documents 104 may be located at one or more locations such as a World Wide Web 108 (hereinafter "web"), one or more content provider(s) 110 or servers, a local memory 112, or any combination thereof.

Each of the web documents 104 may contain one or more data records 114(1)-(n). In some instances, one or more of the data records 114(1)-(n) may contain user-generated content (UGC). As used herein, UGC includes any media content which is produced by end-users and is available to a plurality of users (e.g., publically available, available on a local intranet, etc.). For instance, UGC may include forum posts, reviews, blogs, comments, or any other end-user produced content that is publically available.

The computing device 102 may include a data extraction engine 116 to extract the data records 114(1)-(n) containing the UGC from the web documents 104. For example, a user who is interested in purchasing a new car may use the data extraction engine 116 to mine all customer reviews pertaining to a new car of interest so that the user can make an informed decision on whether to purchase the new car. In other examples, the data extraction engine 116 may be used for question answering, blog or review mining, expert searching on web communities, etc.

In some instances, the techniques of the data extraction engine 116 may be implemented for visualizing, reorganizing or reformatting of the information or the layout of the web documents 104 and thus providing a better browsing experience for users. For example, the data extraction engine techniques may be used to highlight, selectively display only or reformat, certain important blocks (or areas) of the web documents 104 as users browse the web documents in web browsers or mobile devices with limited size of screens. In some instances, this kind of use may be achieved by implementing the techniques of the data extraction engine 116 on the client side such as add-ons of web browsers or applications on mobile devices. In some instances, this kind of use may also be achieved by incorporating the techniques of the data extraction engine 116 into remote intermediate web services between the original web documents 104 and the local browsing devices such as web browsers or mobile devices, which perform the visualizing, reorganizing or reformatting of the web documents 104 and return the processed documents to the local devices; such web services may be located at one or more locations such as a World Wide Web 108, one or more content provider(s) 110 or servers, or any combination thereof.

In other instances, the techniques of the data extraction engine 116 may be used to reduce a size of an index of a search engine, or to improve the relevance of an index of a search engine. For example, for forum pages, if the data records 114 recognized by the data extraction engine 116 are assumed to be the most important parts of the web documents 104, then a search engine may ignore other blocks of the web documents and only index the blocks identified by the data extraction engine 116; by this means the relevance of the index is also improved because other irrelevant and noisy blocks are not indexed.

The data extraction engine 116 may include one or more software application components such as a document retrieval module 118, a HyperText Markup Language (HTML) parser module 120, and a record extraction module 122, wherein the components perform data record extraction. In some instances, the various software application components of the data extraction engine 116 may be implemented as a web browser, or any other application to perform the web data record extraction.

The document retrieval module 118 may retrieve the web documents 104. The web documents 104 may be retrieved from the web 108, the content providers 110, the local memory 112, or any combination thereof. For example, the document retrieval module 118 may retrieve the web documents 104 from either the web 108 or the content providers 110 via a local network transmission line or the Internet. In another example, the document retrieval module 118 may retrieve the web documents 104 from the local memory 112 via a local file I/O path such as a local bus.

After retrieving the web documents 104, the HTML parser module 120 may process the web documents 104 into a Document Object Model (DOM) tree, in which the nodes of DOM tree include the UGC of the web documents. The record extraction module 122 may then use the DOM tree to extract the data records 114 including the UGC from the web documents. Data record of a data record list are deemed as consisting of the same number of sibling sub-trees on the DOM tree of the web document, where each of the sibling sub-trees is deemed the component sub-tree of the record. In various embodiments, the record extraction module 122 utilizes a Mining Data Records Based on Anchor Trees (MiBAT) process to extract the data records 114 from the web documents 104. The extracted data records 114 may be stored, such as to the web 108, content providers 110, and/or the local memory or the extracted data records may be processed for output to the computing device 102.

Figure 2:
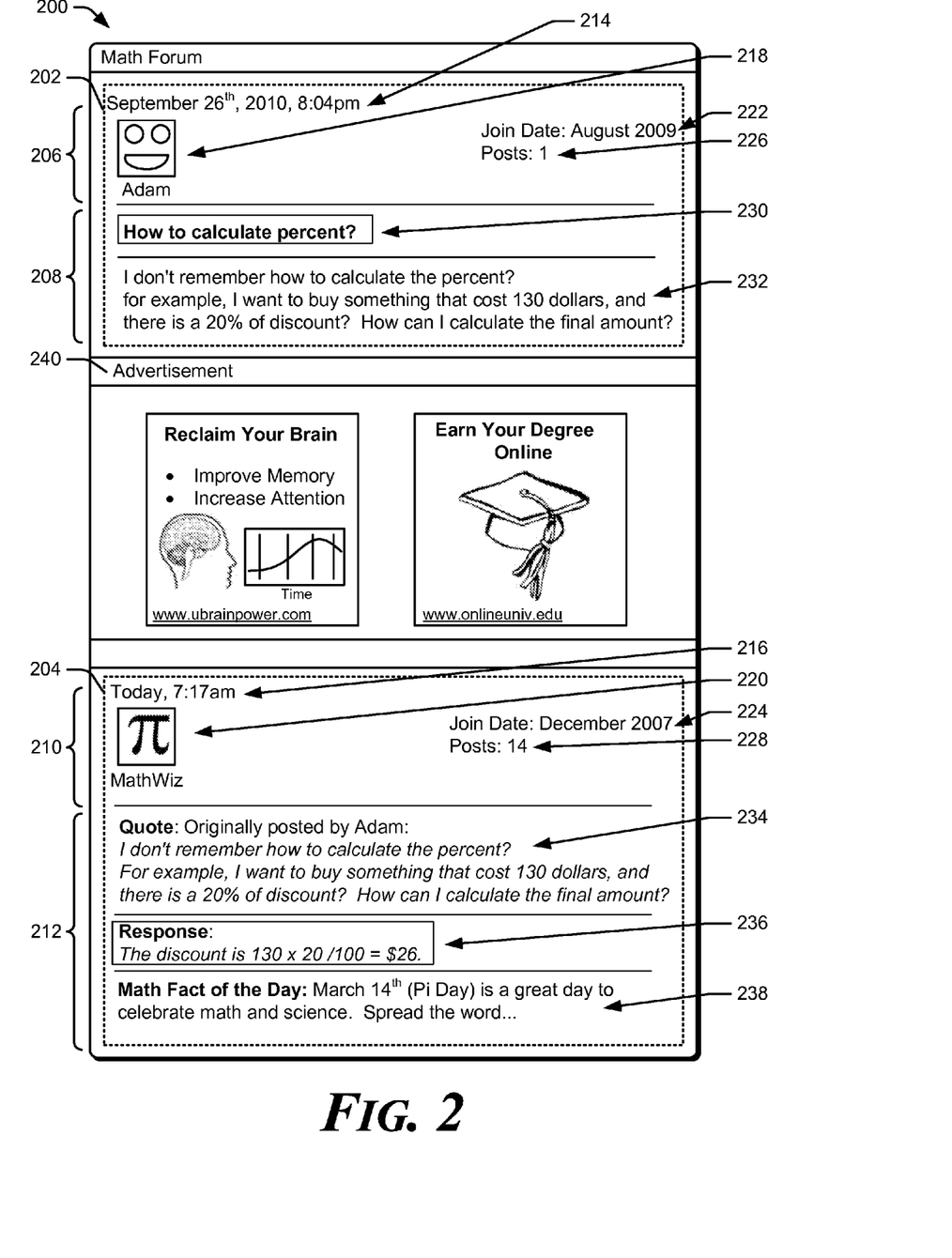
FIG. 2 shows an illustrative web document that includes multiple data records.

FIG. 2 illustrates an example web document 200. The example web document 200 is depicted as a web forum and includes a first data record 202 and a second data record 204, both of which contain UGC. The first data record 202 is a question posted by an online user Adam regarding how to calculate percentages. The second data record 204 is a response to Adam's question posted by an online user MathWiz and includes an equation that can be used to calculate percentages. In general, data records containing UGC usually consist of two parts. First, the data records include a structured part such as author, publication date, etc. Second, the data records include free-format UGC, referred to as the unstructured part. For example, the first data record 202 includes structured part 206 and unstructured part 208. Similarly, the second data record 204 includes structured part 210 and unstructured part 212.

The techniques discussed herein for extracting the data records 202, 204 from the example web document 200 assume that the structured parts 206, 210 have a same structure. For instance, both structured parts 206, 210 include a publication date of the post 214, 216 (i.e., post-date), a username 218, 220 of the entity that made the post, a join date 222, 224 indicating a date the entity joined the forum, and a post number 226, 228 indicating the number of posts made under the username, etc. Due to the free-format nature of UGC, the unstructured part 208, 212 of the data records 202, 204 may not have a same structure. For instance, the unstructured part 208 of the first data record 202 includes two sections. It includes a post title 230 and post content 232 (i.e., original post). However, the unstructured part 212 of the second data record 204 includes three sections. It includes a quote 234 of the original post, a response 236 to the original post, and a quote of the day 238. In addition to the data records 202, 204, the example web document 200 also includes an advertisement section 240 which includes two advertisements. As discussed further below, the data record extraction techniques discussed herein pertain to automatically extracting data records containing the UGC such as data records 202, 204 from such as the example web document 200 even though the data records are not consecutive (i.e., there is an advertisement section between the first data record 202 and the second data record 204) and even though the unstructured parts 208, 212 of the data records vary from data record to data record within the web document. Although the example web document 200 is illustrated as having two data records, record extraction techniques discussed herein may pertain to web documents having more than two data records.

The data record extraction techniques discussed herein are generally discussed in terms of extracting data records from web forums such as the example web document 200. However, the data record extraction techniques may be applied to other types of applications such as blogs, web documents containing user comments (e.g., Twitter®, Flickr®, YouTube®, Digg®), web documents containing user reviews, etc. Accordingly, the data record extraction techniques are not restricted to web forums.

Illustrative Processes

FIGS. 3-7 describe various illustrative processes for implementing data records extraction techniques. The order in which the operations are described in each illustrative process is not intended to be construed as a limitation, and any number of the described blocks can be combined in any order and/or in parallel to implement each process. Moreover, the blocks in FIGS. 3-7 may be operations that can be implemented in hardware, software, and a combination thereof. In the context of software, the blocks represent computer-executable instructions stored on one or more computer-readable storage media that, when executed by one or more processors, cause one or more processors to perform the recited operations. Generally, computer-executable instructions include routines, programs, objects, components, data structures, and the like that cause the particular functions to be performed or particular abstract data types to be implemented.

Figure 3:
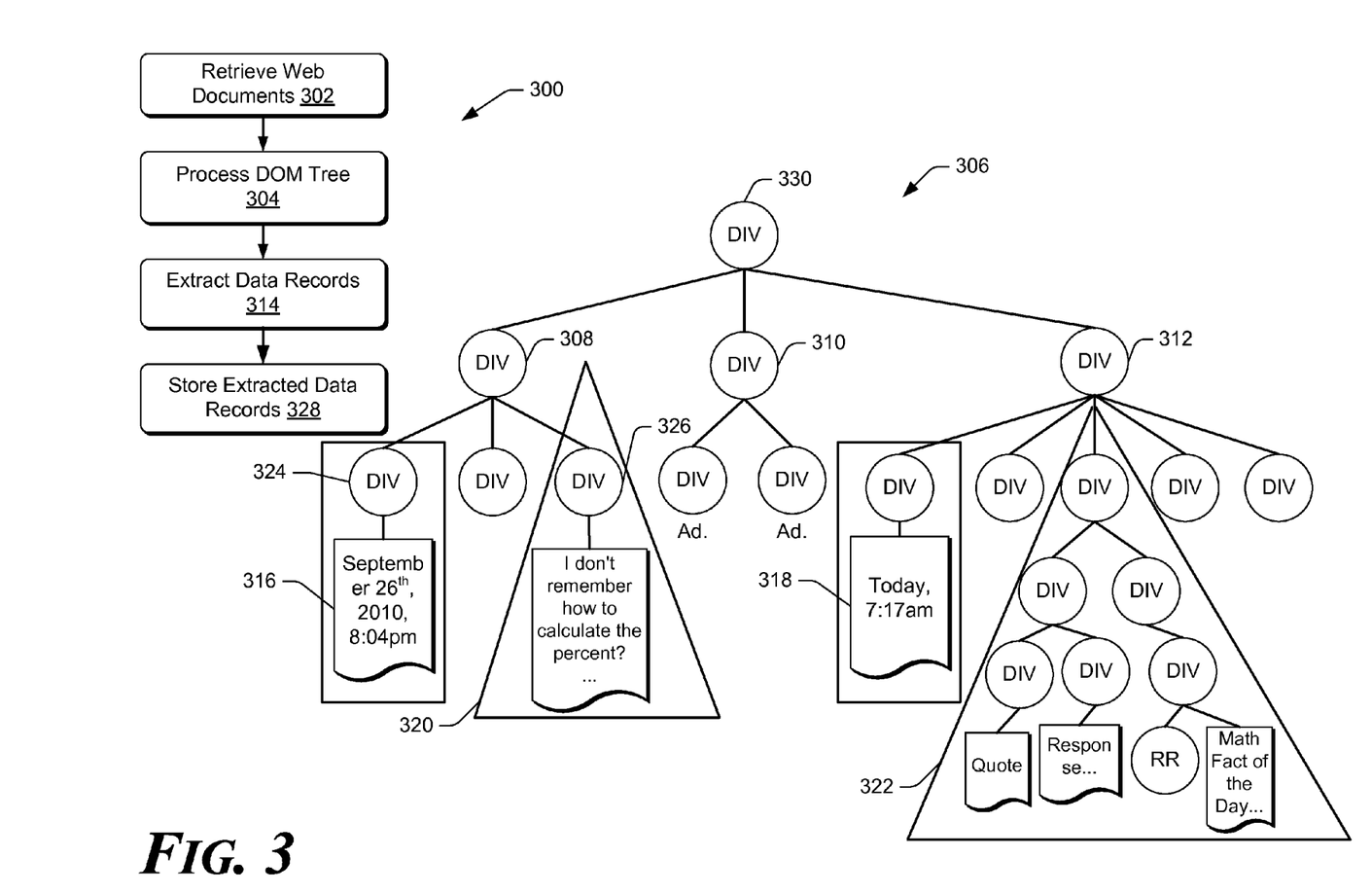
FIG. 3 is a flow diagram that illustrates an illustrative process to extract data records containing user-generated content in accordance with various embodiments.

FIG. 3 describes an illustrative process 300 to extract data records containing user-generated content (UGC) from web documents in accordance with various embodiments. The process 300 may be implemented by the data extraction engine 116 of the computing device 102.

At 302, the document retrieval module 118 retrieves the one or more web documents 104. The document retrieval module 118 may retrieve the web documents 104 from the web 108, the content providers 110, the local memory 112, or any combination thereof.

At 304, the HyperText Markup Language (HTML) parser module 120 may process the web documents 104 into a Document Object Model (DOM) tree. For example, an example DOM tree 306 illustrated in FIG. 3 corresponds to the example web document 200 of FIG. 2. Specifically, the example DOM tree 306 includes a question data record node 308 corresponding to the first data record 202, an advertisement section node 310 corresponding to the advertisement section 240, and a response data record node 312 corresponding to the second data record 204. Note that in the example DOM tree 306, each of the two data records consists of only one component sub-tree, being sub-tree 308 and 312, respectively.

At 314, the record extraction module 122 may use the DOM tree to extract the data records containing UGC from the web document. In some instances, the record extraction module 122 utilizes a Mining Data Records Based on Anchor Trees (MiBAT) process to extract the data records from the web documents 104. In general, the MiBAT process may be formulated as follows. Along a traversal on the DOM tree, for each parent node, (1) locate the anchor trees from the child sub-tree list, (2) determine the record boundary, (i.e. start offset and length), and (3) extract the data record around each anchor tree given the record boundary.

Anchor trees are the component sub-trees of data records on the DOM tree which contain a domain constraint. Although any domain constraint may be used to locate the anchor trees, in some instances the domain constraint is part of the structured data which occurs in every data record once and exactly once and can be easily identified. The lowest nodes of the DOM tree containing the domain constraint are deemed the pivots. For instance, the post-date (i.e., publication date of a data record) may be selected as the domain constraint since almost all data records containing UGC include a publication date and its format can be easily identified. Accordingly the lowest nodes containing the post-date may be the pivots. The record extraction module 122 may use the domain constraint to locate the anchor trees as being the component sub-trees of data records containing the domain constraint at 314. For instance, in the example DOM tree 306, the record extraction module 122 may locate pivot nodes 316, 318 since they are the lowest nodes of the illustrative DOM tree that contain the publication date, and thus locate anchor trees 308 and 312, since they are sibling sub-trees that contain the domain constraints (i.e., the pivots), therefore being component sub-trees of the two data records corresponding to the data records 202 and 204, respectively, in FIG. 2. Note that the advertisement section node 310 does not contain a pivot and thus cannot be an anchor tree since the advertisement section 240 of the example web document 200 does not contain any publication date data.

After locating the anchor trees 308, 312, the record extraction module 122 may determine the record boundary, (i.e. start offset and length) at 314. In general, the record boundary is defined as a set of adjacent sibling component sub-trees around every anchor tree that comprises the data records including both the anchor trees as well as the UGC. For instance, in the example DOM tree 306, the UGC for the question data record node 308 is the collection of nodes represented by a first triangle 320 and the UGC for the response data record node 312 is the collection of nodes represented by a second triangle 322. The start offset of the record boundary is deemed the offset of the left most component sub-tree relative to the anchor tree of each record, and the length is the number of component sub-trees of each record. For the example DOM tree 306, since both records consist of exactly one component sub-tree (i.e., the anchor trees 308 and 312, respectively), the start offset of the record boundary is 0 and the length of the record boundary is 1. Note that this is a fairly easy case for record boundary determination, but there exist more complicated cases as will be discussed in later sections.

After locating the anchor trees 308, 312, and determining the record boundary, the record extraction module 122 may extract the data records containing the UGC from the web document at 314. Unlike prior processes which assume that the data records containing the UGC have similar DOM tree structures, the MiBAT process of the data extraction engine 116 utilizes the domain constraint (i.e., post-date) as part of the MiBAT process to locate and extract the data records. Accordingly, the data extraction engine 116 is able to extract data records containing UGC even if the data records are non-consecutive (i.e., there are advertisements stuck between the data records) and even if a structure of the UGC varies from data record to data record within the web document.

At 328, the data extraction engine 116 may store the extracted data records. For instance, the data extraction engine 116 may store the extracted data records to the web 108, content providers 110, and/or the local memory or the extracted data records may be processed for output to the computing device 102.

Figure 4:
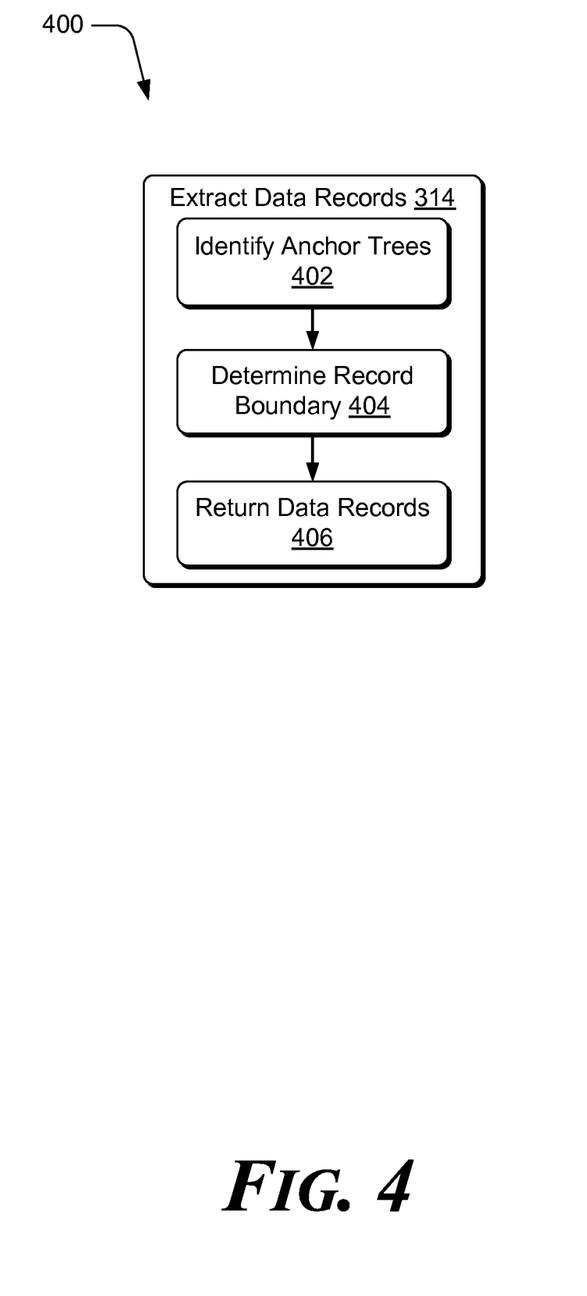
FIG. 4 is a flow diagram that illustrates an illustrative a Mining Data Records based on Anchor Trees (MiBAT) process in accordance with various embodiments.

FIG. 4 describes an illustrative process 400 to extract data records containing UGC using the Mining Data Records Based on Anchor Trees (MiBAT) process. The illustrative process 400 may further illustrate operations performed during the determining the extract data records block 314 of the illustrative process 300.

anchor tree represented by the tree 308 and the anchor tree represented by the tree 312 at 402. The process of identifying the anchor trees is discussed further below with respect to FIG. 5. At 404, the record extraction module 122 determines the record boundary (i.e., line 6 of the pseudo-code of Table 1) which is discussed further below with respect to FIG. 6. At 406, the record extraction module 122 returns the data records (i.e., line 8 of the pseudo-code of Table 1).

Figure 5:
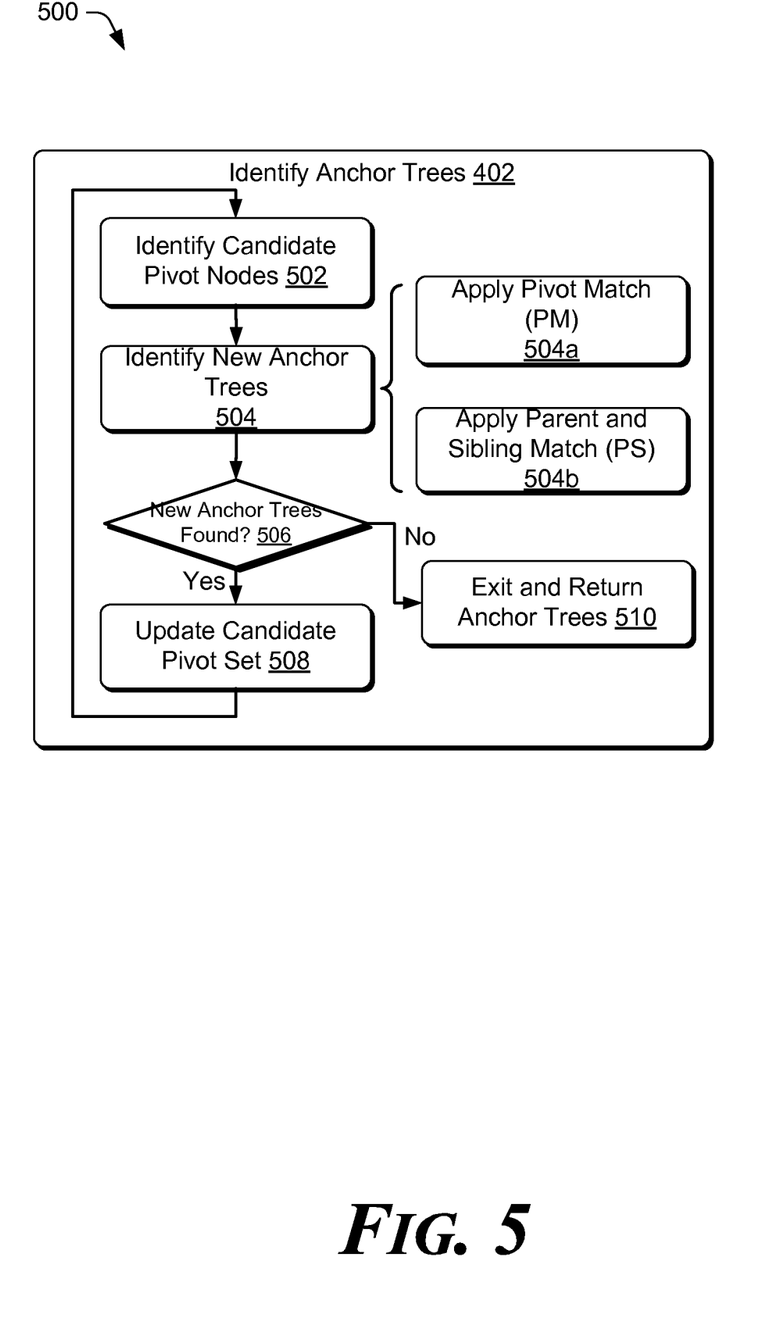
FIG. 5 is a flow diagram that illustrates an illustrative process of identifying anchor trees within a Document Object Model (DOM) tree in accordance with various embodiments.

FIG. 5 describes an illustrative process 500 to locate anchor trees. The illustrative process 500 may further illustrate operations performed during the determining the extract data records block 402 of the illustrative process 400 (i.e., line 4 of the pseudo-code of Table 1).

In general, the record extraction module 122 utilizes domain constraint similarity measures to locate the anchor trees. For reference, pseudo-code illustrating the process 500 of identifying anchor trees is provided below in Table 2.

TABLE 2

Pseudo-Code for identifying anchor trees

```
FINDANCHORTREES (t₁...tₙ)
 1:  Δ ← { }
 2:  covered[i] ← 0 for i = 1 . . . n
 3:  for i ← 1 to n
 4:      if covered[i] = 1 then continue
 5:      aᵢ ← i, m ← 1 ▷ anchor tree list with counter of m
 6:      CPSet ← candidate pivots in t₁ ▷ by classifier
 7:      for j ← i + 1 to n
 8:          if covered[j] = 1 then continue
 9:          matchedCP ← DOMAINCOMPARE(tᵢ, tⱼ, CPSet)
10:          If matchedCP ≠ ∅ ▷ similarity test succeeds
11:              m ← m + 1, aₘ ← j ▷ expand the list
12:              CPSet ← CPSet ∩ matchedCP ▷ update
13:              covered[j] ← 1
14:      if m ≥ 2 ▷ m = 1 means tᵢ is not an anchor tree
15:          Δ ← Δ ∪ {(a₁...aₘ)}
16:  return Δ ▷ return all anchor tree lists
DOMAINCOMPARE(tᵢ, tⱼ, CPSet)
 1:  M ← TREEMATCHING(tᵢ, tⱼ)
 2:  matchedCP ←{ }
 3:  for u in CPSet    ▷ check each in CPSet
 4:      if exists for candidate pivot v in tⱼ that DOMAINSIMILARITY(M, tᵢ, u, tⱼ, v) > τ
              ▷ PM or PS, using u as tᵢ's pivot, v as tⱼ's pivot
 5:          matchedCP ← matchedCP ∪ {u}
 6:  return matchedCP
```

In general, the MiBAT process uses domain constraints to locate and extract data records that contain UGC. For reference, pseudo-code illustrating MiBAT process is provided below in Table 1.

TABLE 1

Pseudo-Code for MiBAT Process

```
MiBAT(T)
1:     Ω ← { }
2:     For parent tree node p in T
3:         t₁ ... tₙ ← the child sub-tree list of p
4:         Δ ← FINDANCHORTREES (t₁ ... tₙ)
5:         for anchor tree list (a₁ ... aₘ) in Δ
6:             R ← DETERMINEBOUNDRY (t₁ ... tₙ, a₁ ... aₘ)
7:             Ω ← Ω ∪{R} ▷ a list of data records found
8:     return Ω          ▷ return all record lists
```

At 402, the record extraction module 122 identifies the anchor trees, $(a_1 \ldots a_n)$ as being a set of one or more sibling sub-trees which include the domain constraint (i.e., line 4 of the pseudo-code of Table 1), from the child sub-tree list $(t_1 \ldots t_n)$ of a parent tree node p. For example, with respect to the example DOM tree 306 of FIG. 3, under the parent node 330, the record extraction module 122 may identify the As discussed above with respect to FIG. 3, the record extraction module 122 utilizes a domain constraint (e.g., post-date), deemed a pivot, to locate the anchor trees. However, not all the nodes containing text having a format of the domain constraint are real pivots. For example, in forum posts, UGC may also contain strings in date format. Accordingly, the process 500 first identifies all candidate pivots at 502 (i.e., line 6 of the pseudo-code of Table 2). The candidate pivots, CPSet, are nodes containing text which is in the format of the domain constraint. For example, if the domain constraint is post-date, then all nodes having text in the format of a date may be considered candidate pivots.

Once the record extraction module 122 identifies the candidate pivots, CPSet, at 502, the record extraction module uses the domain compare function 504 to identify new anchor trees (i.e., lines 9 of the pseudo-code of Table 2). If a new anchor tree is found (i.e., the "yes" path at block 506, line 10 of the pseudo-code of Table 2), the record extraction module 122 then updates the candidate pivot set using the new anchor trees at 508 (i.e., line 12 of the pseudo-code of Table 2). The record extraction module 122 will then iterate the blocks 502-508 until no new anchor trees can be found (i.e., the "no" path at block 506), and will then exit and return the anchor trees at 510. Line 2 of the pseudo-code of Table 2, covered[i]←0 for i=1 . . . n, ensures that a node belongs to at most one anchor tree set. It also helps avoid returning redundant sub-sets of the anchor trees.

The record extraction module 122 uses the domain compare function 504 (i.e., line 9 of the pseudo-code of Table 2) to compare two trees for identifying new anchor trees as well as to determining the matched candidate pivots from among the candidate pivots. Unmatched candidate pivots will not be the real pivots and be discarded from CPSet (i.e., line 5 of the pseudo-code of DomainCompare and line 12 of the pseudo-code of FindAnchorTrees of Table 2). At blocks 502-508, the record extraction module 122 will iteratively filter out the unmatched candidate pivots from CPSet which cannot be the real pivots, resulting in the real pivots as well as the anchor trees. In some instances, applying the Domain Compare function at 504 includes applying a domain constraint guided tree similarity measure such as a pivot match, PM, 504a or a pivot and sibling match, PS, 504b to determine the real pivot node from among the candidate pivots.

In some instances, the record extraction module 122 calculates a tree similarity score, deemed similarity measure, at 504 to determine the real pivot node from among the candidate pivots. The similarity score equation is formulated in Equation (1).

$$TreeSim_f(T_1, T_2) = \frac{|M \cup (f(V_1) \times f(V_2))|}{(|f(V_1)| + |f(V_2)|)/2} \quad (1)$$

In which M is a top down tree mapping result, $T_1$ and $T_2$ are trees, f is a tree fragment selection function which maps the node set V of a tree T to a sub-set of nodes f(V) (i.e., $f(V) \subseteq V$), and $f(V_1) \times f(V_2) = \{(u,v) | u \in f(V_1), v \in f(V_2)\}$.

The pivot match (PM) 504a is the tree similarity measure (Equation (1)) defined by a tree fragment selection function of $f_{PM}(V) = \{p\}$ in which p is the pivot and V is the node set of the DOM tree, constructs a sub-tree template which includes only the pivot itself. In other words, a candidate pivot p in tree V is a real pivot node if there is a matching candidate pivot p in all record trees of the same web document. Since the pivot nodes usually belong to the structured part of the data record, it may be helpful to include the sibling nodes of the pivot in the sub-tree template which are also likely to belong to the structured part. Accordingly, the pivot and sibling match (PS) 504b is the similarity measure defined by a tree fragment selection function of $f_{PS}(V) = \{v | v \in V, parent(v) = parent(p)\}$ in which p is the pivot, v are nodes of the DOM tree, and parent(v) is the parent of v. Thus, under the PS match function, a candidate pivot p in v is a real pivot if all record trees of the same web document are judged to be similar (against a threshold) when taking only p and all of p's siblings into consideration. Since a pivot is obtained from domain constraints, the pivot match (PM) 504a and the pivot and sibling match (PS) 504b are deemed domain constraint guided similarity measures.

Figure 6:
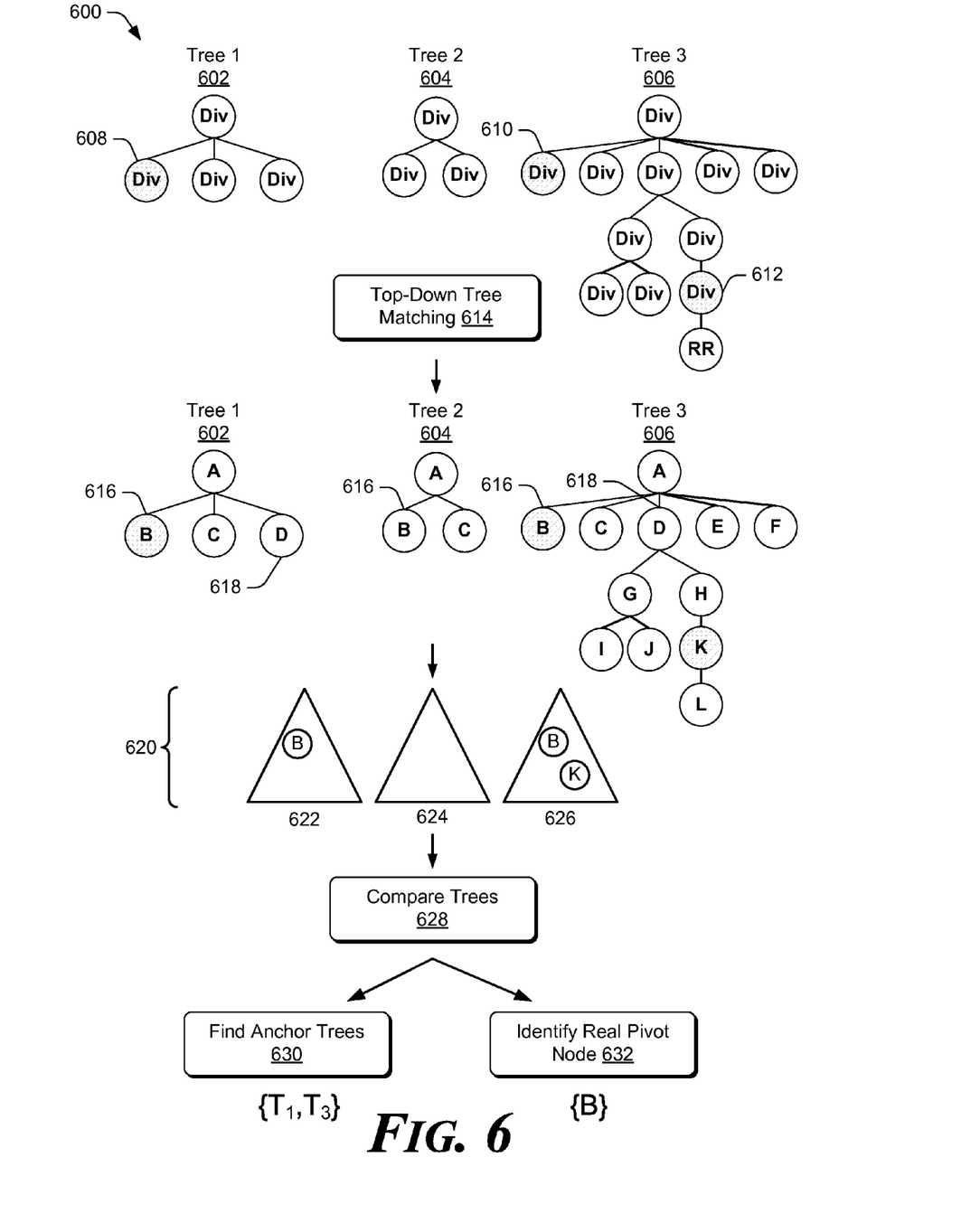
FIG. 6 is a pictorial flow diagram illustrating a process of identifying anchor trees within a Document Object Model (DOM) tree in accordance with various embodiments.

FIG. 6 is a pictorial flow diagram 600 of locating the anchor trees. The pictorial flow diagram 600 begins with three illustrative trees 602, 604, 606. The three illustrative trees 602, 604, 606 may correspond to the example web document 200 of FIG. 2. For example, tree 1 602 may correspond to the first data record 202, tree 2 604 may correspond to the advertisement section 240, and tree 3 606 may correspond to the second data record 204. Using the post-date as an illustrative domain constraint, the highlighted nodes of the illustrative trees 602, 604, 606 represent candidate pivots. For example, node 608 of tree 1 602 is a candidate pivot since it contains the post-date of "Sep. 26, 2010." Node 610 is also a candidate pivot since it contains the post-date of "Today." Node 612 is also a candidate pivot (not a real pivot though) since the second data record 204 has the statement "Math Fact of the Day: March 14th (Pi Day) is a great day to celebrate math and science. Spread the word . . . " which includes the date of March 14$^{th}$.

Given that candidate pivots are only real pivots if they match among all data records, the record extraction module 122 may apply a top-down tree matching algorithm 614 to compare two trees. In some instances, the record extraction module 122 uses block 504 of FIG. 5 to apply the top-down tree matching algorithm at 614. A mapping M from tree $T_1$ to $T_2$ is a set of ordered pairs of nodes (u,v), $u \in T_1$, $v \in T_2$ satisfying conditions that for all $(u_1, v_1), (u_2, v_2) \in M$: 1) $u_1 = u_2$ iff $v_1 = v_2$; 2) $u_1$ is on the left of $u_2$ iff $v_1$ is on the left of $v_2$; and 3) $u_1$ is an ancestor of $u_2$ iff $v_1$ is an ancestor of $v_2$. Under the top-down tree matching algorithm 614, a mapping M from tree $T_1$ to $T_2$ is top-down if it satisfies the condition that for the nodes $u \in V_1$, $v \in V_2$, if $(u, v) \in M$, then (parent(u),parent(v)) $\in M$, where $V_1$ is a sub-tree template of tree $T_1$, $V_2$ is a sub-tree template of tree $T_2$, and parent(v) is the parent of v. To illustrate the top-down tree matching algorithm, for example, the HTML labels in the illustrative trees 602, 604, 606 may be replaced with letters, wherein like letters indicate a positive top-down mapping from tree 1 602 to tree 2 604 to tree 3 606. For instance, node B 616 is consistent among the illustrative trees 602, 604, 606 since node has the same parent node, A, in all three illustrative trees. On the other hand, node D 618 of illustrative tree 602 and 606 does not have a matching node in tree 2 604 since the parent node of D (i.e., A) does not have three children nodes in illustrative tree 2.

In light of the top-down tree matching algorithm 614, the illustrative trees 602, 604, 606 may be visually simplified to a collection of trees 620 comprising the candidate pivots. For instance, the collection of trees 620 may include a first tree 622 which comprises node B since node B is the only candidate pivot in the illustrative tree 1 602. A second tree 624 does not contain any candidate pivots since the illustrative tree 2 (i.e., the advertisement section 240) does not contain any date data. A third tree 626 contains the two candidate pivots B and K since the illustrative tree 606 includes dates.

At 628, the record extraction module 122 may compare the illustrative trees 602, 604, 606 using one of the similarity measures (i.e., pivot match, PM, 504a or pivot and sibling match, PS, 504b). In some instances, the record extraction module 122 uses the domain compare function 504 to compare the two trees at 628 in order to find the anchor trees 630 and identify the real pivot node 632.

For example, using the illustrative trees 602, 604, 606, the record extraction module 122 may start with illustrative tree 1 and define the candidate pivot set (denoted as CPSet in the pseudo-code of Table 2) as being {B}. Illustrative tree 2 604 is skipped since it does not contain any candidate pivots. Lastly, illustrative tree 3 604 is added to the anchor tree list (i.e., line 11 of the pseudo-code of Table 2) and CPSet is updated to be {B} since B is the only candidate pivot that is common to illustrative trees 602 and 606 (K, although also a candidate pivot for tree 606, will not be added to CPSet because it does not exist in tree 602). Accordingly, the domain compare function 508 successfully identifies anchor trees as being illustrative trees 602 and 606 as well as finds the real pivot node B. Note that in most instances, a web document contains more than three records (i.e., there are more than three trees). In such instances, the record extraction module 122 will loop through each of the trees in the document to update the candidate pivot set (CPSet) and determine both the set of anchor trees as well as identify the true pivot node from among the candidate pivots.

As illustrated by the pictorial flow diagram 600, the data extraction engine 116 is able to extract the data records containing the UGC even though the data records containing the UGC are non-consecutive and even though the UGC is unstructured.

Figure 7:
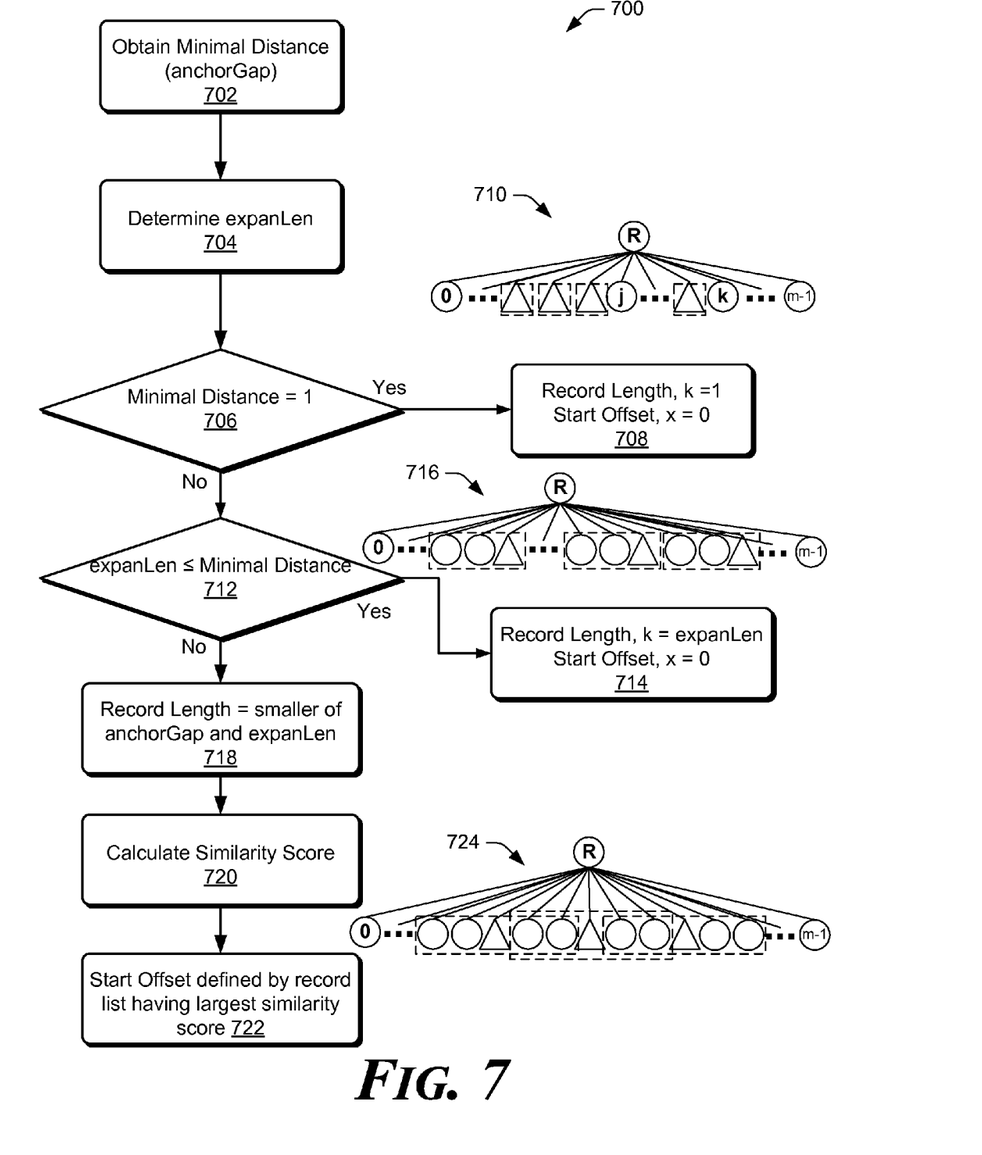
FIG. 7 is a flow diagram that illustrates an illustrative process of determining record boundaries in accordance with various embodiments.

FIG. 7 describes an illustrative process 700 to determine record boundaries. The illustrative process 700 may be performed by the record extraction module 122 and may further illustrate operations performed during the determine record boundary block 404 of the illustrative process 400 (i.e., line 6 of the pseudo-code of Table 1).

For reference, pseudo-code illustrating the process 700 of determining record boundaries is provided below in Table 3.

TABLE 3

Pseudo-Code for determining record boundaries

```
DETERMINEBOUNDARY (t₁...tₙ,a₁...aₘ)
 1:   anchorGap ← min_{1<i≤m}(aᵢ − aᵢ₋₁)
 2:   left ← 0                    ▷ left boundary of expansion
 3:   for k ← 1 to min{anchorGap, a₁} − 1
 4:       if exists 1 ≤ i,j ≤ m that DIFFTAG(t_{aⱼ−k}, t_{aⱼ−k})
 5:           break
 6:       else
 7:           left ← left − 1
 8:   right ← 0                   ▷ right boundary of expansion
 9:   for k ← 1 to min{anchorGap − 1,n − aₘ}
10:       if exists 1 ≤ i,j ≤ m that DIFFTAG(t_{aⱼ+k}, t_{aⱼ+k})
11:           break
12:       else
13:           right ← right + 1
14:   expanLen ← right − left + 1   ▷ length of expansion
15:   R* = [ ]                      ▷ initialize the result
16:   k ← min{anchorGap, expanLen}  ▷ length of record
17:   for x ← k − expanLen to 0     ▷ enumerate start offset
18:       Rᵢ⁽ˣ⁾ ← t_{aᵢ+x}...t_{aᵢ+x+k−1} for i = 1...m
19:       R⁽ˣ⁾ ← R₁⁽ˣ⁾...Rₘ⁽ˣ⁾       ▷ records of the current offset
20:       R* = argmax{Score(R*), Score(R⁽ˣ⁾)} ▷ Equation (2)
21:   return R*                     ▷ return the best record list
```

At 702, the record extraction module 122 obtains the minimal distance, anchorGap, between two anchor trees (i.e., line 1 of the pseudo-code of Table 3). In some instances, the record extraction module 122 calculates the distance between each pair of the anchor trees located in the illustrative process 500 and then sets anchorGap to be the minimum of these distances. Using the collection of tree fragments 620 as an example, the record extraction module 122 may calculate the minimal distance, anchorGap, to be 2 since the second tree 624 is not an anchor tree which separates the first tree 622 (i.e., an anchor tree) from the third tree 626 (i.e., an anchor tree).

At 704, the record extraction module 122 determines the expansion length, expanLen (i.e., lines 2-14 of the pseudo-code of Table 3). In some instances, the record extraction module 122 starts from each anchor tree and expands the data record in both directions from the anchor tree until one of two conditions are met. First, the record extraction module 122 ceases expanding in a direction if the record extraction module 122 encounters either a left or right boundary of the child sub-tree list or another anchor tree (i.e., line 3 and 9 of the pseudo-code of Table 3). Second, the record extraction module 122 ceases expanding in a direction if the newly expanded data record violates a similarity assumption (i.e., line 4 and 10 of the pseudo-code of Table 3).

The similarity assumption may be formulated as follows. Data records must be structurally similar with each other to some extent. Specifically, given any two records, the structure of the data records must satisfy two conditions. First, all pairs of corresponding sub-trees in the data records must have the same HTML tag at root (i.e. the two sub-tree lists must have the same tag sequence at the top level). Second, one pair of corresponding sub-trees in the data records such as the anchor trees must be judged as similar with respect to the domain constraint guided similarity measure in use (i.e., either PM or PS).

At blocks 706-722, the record extraction module 122 determines the record length, k, and the start offset, x. In some instances, the record extraction module 122 may use logic to determine the record length. For instance, if the minimal distance obtained at block 702 is equal to 1 (i.e., the "yes" path at block 706), then the record length, k, is determined to be 1 and the start offset, x, is determined to be 0 at block 708. One example of the situation discussed at block 708 is illustrated in the first illustrative DOM tree 710 where the triangles denote anchor trees and the dashed boxes denote expansions. In other words, if the minimal distance obtained at block 702 is equal to 1 then two or more of the anchor trees are adjacent and thus every single anchor tree forms its own data record.

If the minimal distance obtained at block 702 is 2 or greater (i.e., the "no" path at block 706), then the process 700 continues to block 712. At 712, the record extraction module 122 determines whether the expanLen determined at 704 is less than or equal to the minimal distance calculated at 702. If the expanLen calculated at 704 is less than or equal to the minimal distance calculated at 702 (i.e., the "yes" path at block 712), then, at block 714, the record length, k, is determined to be the expanLen (i.e., determined at block 704) and the start offset, x, is determined to be 0. One example of the situation discussed at block 714 is illustrated in the second illustrative DOM tree 716 where the triangles denote anchor trees and the dashed boxes denote expansions. In other words, the length of each expansion is less than or equal to the minimal distance between two anchor trees. For instance, in the second illustrative DOM tree 716, the expansion is circle, circle, triangle (i.e., TR, TR, DIV). In such a case, no two expansion regions around different anchor trees overlap with each other and it is natural that the sub-trees within each expansion form a data record.

If the expanLen calculated at 704 is greater than the minimal distance calculated at 702 (i.e., the "no" path at block 712), then the process 700 continues to block 718. At 718, the record length, k, is the smaller one between the minimal distance obtained at block 702 (anchorGap) and the expanLen determined at block 704 (i.e., line 16 of the pseudo-code of Table 3). At 720, the record extraction module 122 calculates the similarity score, Score(R⁽ˣ⁾), for each record list, R⁽ˣ⁾, using Equation (2).

$$\text{Score}(R^{(x)}) = \Sigma_{1<i\le m} \Sigma_{0\le j<k} \text{TreeSim}(t_{a_i+x+j}, t_{a_{i-1}+x+j}) \quad (2)$$

In which the record list is $R^{(x)} = R_1^{(x)} \ldots R_m^{(x)}$ (i.e., line 19 of the pseudo-code of Table 3), where $R_i^{(x)} = t_{a_i+x} \ldots t_{a_i+x+k-1}$ is the sub-tree list of the ith record (i.e., line 18 of the pseudo-code of Table 3); TreeSim($t_1, t_2$) is computed as Equation (1) by taking a tree fragment selection of f(V)=V.

After calculating the similarity score for each record list, the record extraction module 122 determines the start offset to be the offset leading to the record list that has the best similarity score at 722. One example of the situation discussed at blocks 718-722 is illustrated in the third illustrative DOM tree 724 where the triangles denote anchor trees and the dashed boxes denote expansions. In other words, if length of each expansion is greater than the minimal distance between two anchor trees, there must be two expansion regions overlapping on a few sub-trees. For instance, in the third illustrative DOM tree 724, where the expansion around each anchor tree contains exactly sub-trees of circle, circle, triangle, circle, circle, (i.e., TR, TR, DIV, TR, TR) and two consecutive expansion regions overlap on two sub-trees of circle, circle (i.e., TR, TR). In this case, the largest record length will be determined by the minimal distance of two anchor trees, (i.e. 3 in third illustrative DOM tree 724), and there will be ambiguity about the start offset of the data record. For example in third illustrative DOM tree 724 there are three possible start offsets, i.e. −2, −1 and 0 respectively. In this case, the record extraction module 122 finds the start offset leading to the maximum similarity among each of the possible choices using Equation (2).

Illustrative Computing Device

Figure 8:
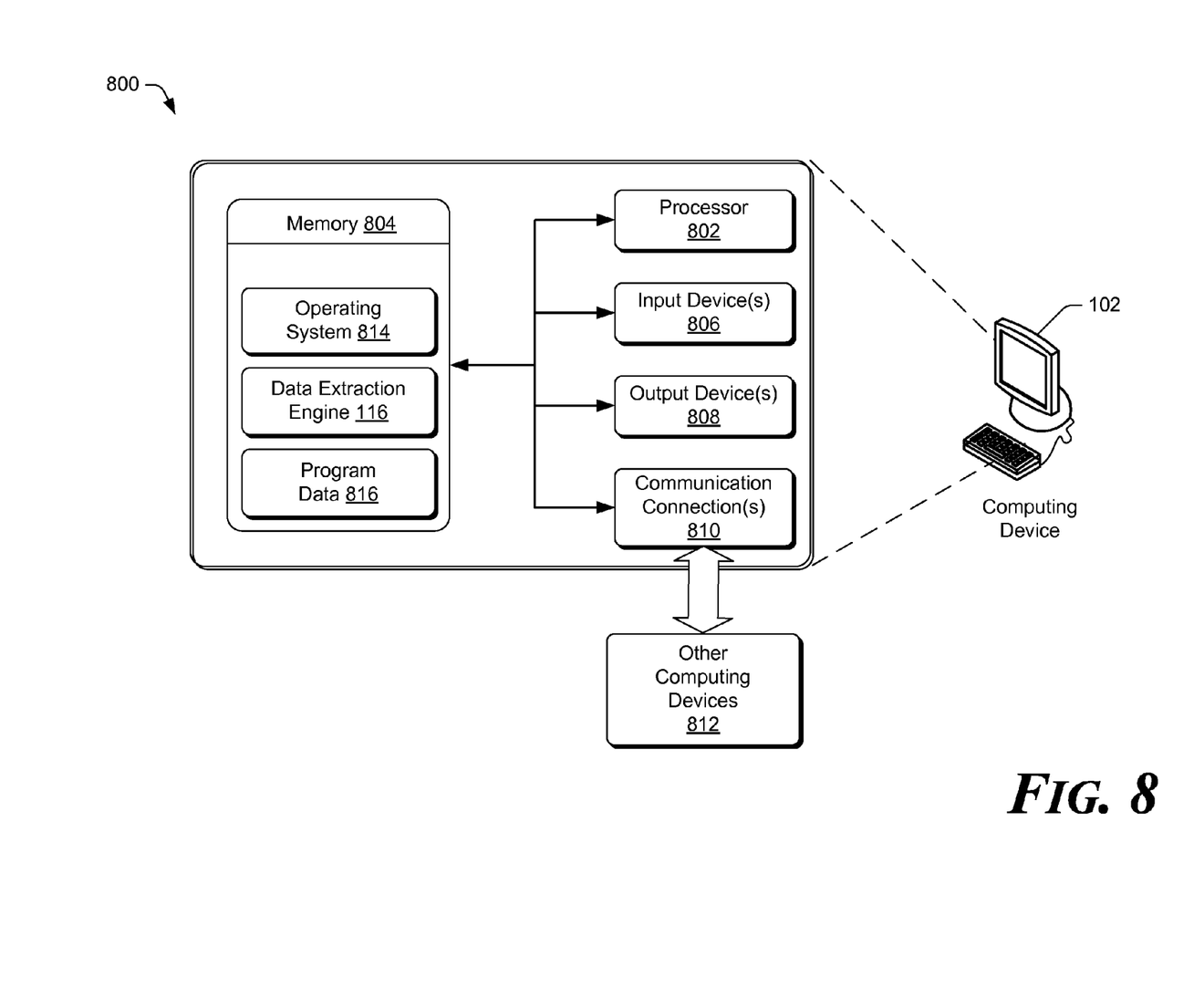
FIG. 8 is a block diagram that illustrates a representative system that may implement the data extraction engine.

FIG. 8 illustrates a representative system 800 that may be used to implement the data extraction engine 116. However, it will readily appreciate that the techniques and mechanisms may be implemented in other systems, computing devices, and environments. The representative system 800 may include the computing device 102 of FIG. 1. However, the computing device 102 shown in FIG. 8 is only one illustrative of a computing device and is not intended to suggest any limitation as to the scope of use or functionality of the computer and network architectures. Neither should the computing device 102 be interpreted as having any dependency nor requirement relating to any one or combination of components illustrated in the representative system 800.

The computing device 102 may be operable to extract data records containing user-generated content (UGC) from web documents. For instance, the computing device 102 may be operable to receive web documents, parse web documents into DOM trees, and extract data records from the web documents.

In at least one configuration, the computing device 102 comprises one or more processors 802 and memory 804. The computing device 102 may also include one or more input devices 806 and one or more output devices 808. The input devices 806 may be a keyboard, mouse, pen, voice input device, touch input device, etc., and the output devices 808 may be a display, speakers, printer, etc. coupled communicatively to the processors 802 and the memory 804. The computing device 102 may also contain communications connection(s) 810 that allow the computing device 102 to communicate with other computing devices 812 such as via a network.

The memory 804 of the computing device 102 may store an operating system 814, the data extraction engine 116, and may include program data 816. The memory 804, or portions thereof, may be implemented using any form of computer-readable media that is accessible by the computing device 102. Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

As described above, the data extraction engine 116 may extract data records containing UGC using the processes illustrated in FIGS. 3-7. For instance, the data extraction engine 116 may enable the computing device 102 to retrieve web documents, process the web documents into a DOM tree, extract data records from the web document, and store the extracted data records to the program data 816.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A system comprising:
one or more processors;
memory;
a parser module maintained in the memory and executable by the one or more processors to process a document into a Document Object Model (DOM) tree that includes at least two nodes corresponding to user-generated content within data records of the document; and
a record extraction module maintained in the memory and executable by the one or more processors to locate two or more anchor trees in the DOM tree as being a first set of sibling sub-trees in the DOM tree that each include a domain constraint associated with a structured portion of individual ones of the data records, determine a minimal distance as a minimum among distances between any two anchor trees of the two or more anchor trees determined based at least in part on a number of sibling sub-trees in the DOM tree that are between the any two anchor trees, determine a record boundary based at least in part on the minimal distance, the record boundary being a second set of sibling sub-trees in the DOM tree around individual ones of the anchor trees that include at least a portion of the user-generated content, and extract the data records around at least one of the anchor trees based at least in part on the record boundary.

2. The system of claim 1, wherein locating the two or more anchor trees includes applying a domain constraint guided similarity measure to locate the two or more anchor trees, where the similarity measure is either a pivot match (PM) that includes a pivot node of the DOM tree, the pivot node comprising the domain constraint, or a pivot and sibling match (PS) that includes both the pivot node of the DOM tree along with all nodes that are siblings of the pivot node.

3. The system of claim 1, wherein the record boundary includes both a start offset and a record length, and wherein the record length is less than or equal to the minimal distance.

4. The system of claim 1, wherein the record extraction module is to further highlight, selectively display or reformat, portions of the document while the document is rendered for display by the system, the highlighted, selectively displayed or reformatted portions being one or more portions of the document that contain the user-generated content.

5. The system of claim 1, wherein the record extraction module is to further:
identify candidate pivots as being lowest nodes of the DOM tree that have content in a format of the domain constraint, and apply a domain constraint guided similarity measure to locate the two or more anchor trees as being the first set of sibling sub-trees that each include the domain constraint.

6. The system of claim 1, wherein the record extraction module is to further extract two or more non-consecutive data records from the document.

7. The system of claim 1, wherein each of the anchor trees is a segment of a data record within the DOM tree that has a DOM tree structure that matches DOM tree structures of all other data records in the document that contain the user-generated content when analyzed using a top-down tree matching procedure, based on domain constraint guided similarity measures, the similarity measures being either a pivot match (PM) or a pivot and sibling match (PS).

8. The system of claim 1, wherein only the data records extracted by the record extraction module are indexed by a search engine.

9. The system of claim 1, further comprising a document retrieval module maintained in the memory and executable by the one or more processors to retrieve the document.

10. A method, comprising:
processing a document into a Document Object Model (DOM) tree that includes at least two nodes corresponding to user-generated content within data records of the document;
locating two or more anchor trees in the DOM tree as being a first set of sibling sub-trees in the DOM tree that each include a domain constraint associated with a structured portion of individual ones of the data records;
determining a minimal distance as a minimum among distances between any two anchor trees of the two or more anchor trees, wherein the distances are determined based at least in part on a number of sibling sub-trees in the DOM tree that are between the any two anchor trees;
determining a record boundary based at least in part on the minimal distance, the record boundary being a second set of sibling sub-trees in the DOM tree that surround individual ones of the anchor trees and that include at least a portion of the user-generated content; and
extracting the data records around at least one of the anchor trees based on the record boundary.

11. The method of claim 10, further comprising:
identifying candidate pivots as being lowest nodes of the DOM tree that have content in a format based on the domain constraint; and
applying a domain constraint guided similarity measure to locate the two or more anchor trees as being a set of nodes that encompass the domain constraint.

12. The method of claim 10, wherein the locating the two or more anchor trees includes applying a domain constraint guided similarity measure to locate the two or more anchor trees, and the similarity measure being either a pivot match (PM) that matches a pivot node of the DOM tree, the pivot node comprising the domain constraint, or a pivot and sibling match (PS) that matches both the pivot node of the DOM tree along with all nodes that are siblings of the pivot node.

13. The method of claim 10, wherein the determining the record boundary determines both a start offset and a record length, and wherein the record length is less than or equal to the minimal distance.

14. The method of claim 10, wherein the extracting the data records extracts two or more non-consecutive data records from the document.

15. The method of claim 10, further comprising highlighting, selectively displaying or reformatting, portions of the document while the document is rendered for display, the highlighted, selectively displayed or reformatted portions being one or more portions of the document that contain the user-generated content.

16. A computer storage medium storing computer-executable instructions that, when executed, cause one or more processors to perform acts comprising:
processing a document into a Document Object Model (DOM) tree that includes at least two nodes corresponding to user-generated content within data records of the document;
locating two or more anchor trees in the DOM tree as being a first set of sibling sub-trees in the DOM tree that each include a domain constraint associated with a structured portion of individual ones of the data records;
determining a minimal distance as a minimum among distances between any two anchor trees of the two or more anchor trees, wherein the distances are determined based at least in part on a number of sibling sub-trees in the DOM tree that are between the any two anchor trees;
determining a record boundary based at least in part on the minimal distance, the record boundary being a second set of sibling sub-trees in the DOM tree that surround individual ones of the anchor trees and that include at least a portion of the user-generated content; and
extracting the data records around at least one of the anchor trees based on the record boundary.

17. The computer storage medium of claim 16, the acts further comprising:
identifying candidate pivots as being lowest nodes of the DOM tree that have content in a format of the domain constraint; and
applying a domain constraint guided similarity measure to locate the two or more anchor trees as being the first set of sibling sub-trees that each include the domain constraint.

18. The computer storage medium of claim 17, wherein the domain constraint guided similarity measure is either a pivot match (PM) that matches a pivot node of the DOM tree, the pivot node comprising the domain constraint, or a pivot and sibling match (PS) that matches both the pivot node of the DOM tree along with all nodes that are siblings of the pivot node.

19. The computer storage medium of claim 16, wherein the extracting the data records extracts two or more non-consecutive data records from the document.

20. The computer storage medium of claim 16, wherein the distances are determined as a sum of one plus the number of the sibling sub-trees in the DOM tree that are between the any two anchor trees.

* * * * *